United States Patent

Haeussling et al.

[11] Patent Number: 5,574,130
[45] Date of Patent: Nov. 12, 1996

[54] FUNCTIONALIZED POLYLACTIDE

[75] Inventors: Lukas Haeussling, Laubenheim; Gregor Brodt, Heppenheim, both of Germany

[73] Assignee: BASF Aktiengesellschaft, Ludwigshafen, Germany

[21] Appl. No.: 469,783

[22] Filed: Jun. 6, 1995

Related U.S. Application Data

[63] Continuation of Ser. No. 238,881, May 6, 1994, abandoned.

[30] Foreign Application Priority Data

May 11, 1993 [DE] Germany .......................... 43 15 611.8

[51] Int. Cl.⁶ ................................................... C08G 63/08
[52] U.S. Cl. .............................. 528/354; 528/26; 528/28; 528/76; 528/80; 528/83; 528/361; 525/415
[58] Field of Search ................................... 528/80, 26, 28, 528/76, 83, 354, 361; 525/415

[56] References Cited

U.S. PATENT DOCUMENTS

| | | | |
|---|---|---|---|
| 3,970,687 | 7/1976 | Braun | 560/159 |
| 4,804,691 | 2/1989 | English et al. | 523/118 |
| 5,202,413 | 4/1993 | Spinu | 528/354 |
| 5,225,521 | 7/1993 | Spinu | 528/354 |
| 5,346,966 | 9/1994 | Spinu | 525/411 |

FOREIGN PATENT DOCUMENTS

WO89/05830  6/1989  WIPO.

OTHER PUBLICATIONS

Marcromolecular Engineering . . . Barakat et al., Jrl. of Polymer Science: vol. 31, 505–514 (1993).
Biodegradable Tissue Adhesives, Dunn et al., 501–502.
Japanese Abstract 1,170,609.
Chem. Abst., vol. 68, No. 24, Jun. 10, 1968, Abstract No. 105798y (English abstract of JP–A 43 002 949).
Chem. Abst., vol. 119, No. 26, Dec. 27, 1993, Abstract No. 272034z (English abstract of JP–A 5 148 352).

*Primary Examiner*—Shelley A. Dodson
*Attorney, Agent, or Firm*—Keil & Weinkauf

[57] ABSTRACT

Polylactide of the general structure I $$(R^1-OCONH)_n-R^2 \qquad (I)$$

where $R^1$ is a polylactide residue with a molecular weight of from 500 to 500,000 or a degree of polymerization, based on lactic acid units, of about 5 to 5500 and $R^2$ is the n-functional radical of a tri-, tetra- or polyisocyanate.

5 Claims, No Drawings

FUNCTIONALIZED POLYLACTIDE

This application is a continuation of application Ser. No. 08/238,881, filed on May 6, 1994 now abandoned.

Polylactide is used in surgery for bonding living tissue and is absorbed over the course of time. However, the introduction of ceramic prosthetic material fails because of adhesion problems. An overview of the prior art of interest for understanding the invention is to be found in the following publications:

Dunn et al. Polymer Preprints 30 (1989) 501 and U.S. Pat. No. 4,804,691 use polylactide diols and triols which they have reacted with a large excess of diisocyanate. This results in a polymer which is provided at both or three ends with isocyanate groups. This polymer, especially the branched variant, attains a sufficient adhesive action between two portions of tissue owing to its multifunctional structure. However, bonding of living tissue with artificial organs made of organic material or polymeric materials cannot be achieved with this. Moreover, no further functionalization by reaction on the isocyanate end groups and thus optimization of the adhesive action depending on the material to be bonded is described.

Barakat et al. describe in J. Poly. Sci. A. Polym. Chem. 31 (1993) 505–514 the synthesis of polylactide using aluminum alkyls $Et_{3-p}Al(OCH_2X)_p$ with P=1.3, in which case it is possible to introduce a specific end group by the choice of the substituent X. However, X cannot be an isocyanate group for chemical reasons.

Polylactide is, however, also used in the synthesis of polyurethanes. WO 8 905 830 describes the incorporation of polyester diol based on cyclic polyol, L-lactide or a lactone into the soft segment of a polyurethane, which leads to conditional biodegradability of the polymer. JA-A 1 170 609 describes UV- and electron beam-curable resins based on urethane (meth)acrylates which have 2,2-di(hydroxymethyl)lactic acid incorporated as monomer for the soft segment. However, these documents do not mention any polymers terminated with isocyanate groups. The polylactide units are in each case incorporated into the soft segment of the polyurethane and not used to form side chains. A possible preparation of comb-like polymers with polylactide in the side chain is not described.

According to the invention, polylactide is reacted with polyfunctional isocyanates. The polymers which are obtained in this way and are terminated with isocyanate groups can be provided with further anchor groups which can be made to suit the particular substrate surface. The adhesion properties are moreover controlled via the end groups of the polylactide, the interaction with, for example, a polylactide film or other materials via the polymer chain. An applied polylactide film can from ceramic material after its treatment with the polymers according to the invention no longer be detached from the substrate by simple means. The polylactides terminated with isocyanate groups or else with other anchor groups which can react with isocyanates can be incorporated into the side chains of polyurethanes, which then leads to comb-like polymer products.

The present invention relates directly to polylactide of the general structure I

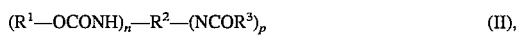

where $R^1$ is a polylactide residue with a molecular weight of from 500 to 500,000 or a degree of polymerization, based on lactic acid units, of about 5 to 5500 and $R^2$ is the n-functional radical of a tri-, tetra- or higher polyisocyanate, wherein n is the number of isocyanate groups originally on $R^2$.

According to another embodiment of the invention, polylactide of the general structure II is proposed

where $R^1$ is a polylactide residue with a degree of polymerization, based on lactic acid units, of about 5 to 5500, $R^2$ is the (n+p)-functional radical of a tri-, tetra or higher isocyanate, wherein (n+p) represents the number of isocyanate groups originally on $R^3$ and n and p are each whole numbers greater than zero $R^3$ is the radical of a compound able to react with isocyanate.

The polymers according to the invention can be used, for example, in the following areas:

Adhesion promoters with the special property of biodegradability

Biodegradable adhesives for medical applications (in vivo applications)

Application of the isocyanate-terminated polymers as isocyanate component and of the polymers able to react with isocyanates as chain extenders in the preparation of polyurethanes.

The compound corresponding to the general structure I can be obtained as follows:

Polylactide is introduced into a solvent, and the isocyanate, which is at least trifunctional, is added. A catalyst promoting the urethane reaction is added at elevated temperature, and the reaction mixture is stirred until the isocyanate number is constant.

The compound corresponding to the general structure II can be prepared in a variety of ways:

Either the particular polylactide is introduced into the solvent, and the isocyanate which is at least trifunctional, and the catalyst are added, the mixture is stirred until the isocyanate number is constant, and a compound able to react with isocyanates, in particular a compound containing hydroxyl and/or amino and/or mercapto groups, is added, and the reaction mixture is reacted further. It is also possible to react the latter and the isocyanate which is at least trifunctional in the solvent with the aid of the catalyst and then to add the polylactide and react it.

Or the compound containing at least one hydroxyl and/or amino and/or mercapto group is reacted.

Examples of suitable isocyanates are the following compounds, some of which are commercially available

| 1. Mixture of: | 0–1% | hexamethylene diisocyanate |
| | 40–80% | N,N',N"-tris[ω-isocyanatohexamethylene]-biuret |
| | 20–60% | polyisocyanate with a functionality (F) of more than 3 |
| (obtainable under the name ® Basonat P LR 8401 or ® Desmodur N) | | |
| 2. Mixture of: | 0–1% | hexamethylene diisocyanate |
| | 40–80% | 1,3,5-tris[ω-isocyanatohexamethylene]-2,4,6-trioxohexahydro-1,3,5-triazine |
| | 20–60% | polyisocyanate with F > 3 |
| (obtainable under the name ® Basonat P LR 8638X or ® Desmodur VP 524-44) | | |
| 3. Mixture of: | 0–1% | toluylene diisocyanate |
| | 40–80% | 1,3,5-tris[3-isocyanato-4-methylphenyl]-2,4,6-trioxohexahydro-1,3,5-triazine |
| | 20–60% | polyisocyanate with F > 3 |
| (obtainable under the name ® Basonat P LR 8638X or | | |

® Desmodur IL)
4. Mixture of:  0–1%  toluylenediisocyanate
               40–80% 2-ethyl-1,2,3-tris[3-isocyanato-
                      4-methylanilinocarbonyloxy]propane
               20–60% polyisocyanate with F > 3
   (obtainable under the name ® Lupranat VP 9131 or
   ® Desmodur L)
5. Mixture of:  0–5%  methylenebiphenyl diisocyanate
               30–80% 2,4-bis[4-isocyanatobenzyl]-
                      1-isocyanatobenzene
               10–50% (4-isocyanato-3-(4-isocyanatobenzyl)-
                      phenyl]methane
                5–60% polyisocyanate with F > 4
6. N,N',N"-Tris[ω-isocyanatohexamethylene]biuret
7. 1,3,5-Tris[ω-isocyanatohexamethylene]-2,4,6-trioxohexa-
   hydro-1,3,5-triazine
8. 2-Ethyl-1,2,3,tris[3-isocyanato-4-methylanilinocarbonyloxy]-
   propane
9. [4-Isocyanato-3-(4-isocyanatobenzyl)phenyl][2-isocyanato-5-
   (4-isocyanatobenzyl)phenyl]methane
10. 1,3,5-Tris-[3-isocyanato-4-methylphnyl]-2,4,6-trioxohexa-
    hydro-1,3,5-triazine Examples of suitable end-group formers are the following compounds:

3-Aminopropyltrimethoxysilane, mercaptosuccinic acid, thioglycolic acid, 2-mercaptopropionic acid, 3-aminopropyltriethoxysilane, cyanoguanidine, ammonia, 2,4-dinitroaniline, 2-methoxy-5-nitroaniline, diaminomaleonitrile, 3-amino-1H-1,2,4-triazole, N,N-dimethylethylenediamine, melamine, 9-aminoacridine, triethylenetetramine and other compounds containing at least one amino, mercapto or hydroxyl group, such as amino acids, amino phosphonates, mercapto phosphonates or hydroxy sulfonates.

Catalysts which promote the urethane reaction are known; the following compounds can be used, for example: dibutyltin dilaurate, tin octoate, diethylenetin dichloride, 1,4-diazabicyclo[2.2.2]octane, tetramethylenebutanediamine, dimethylcyclohexylamine, iron acetylacetonate, and alkali metal salts of carboxylic acids.

Commercial products can be used as polylactide. However, mixtures with other biodegradable polymers as described by Törmälä, Adv. Mater. 4 (1992) 589 can also be used. It is furthermore possible to use a polylactide with carboxylate end groups prepared by initiating the polymerization with, for example, Sn(II) octoate. Other polylactide syntheses have been described, for example, by Dahlmann et al., Br. Polym. J. 23 (1990) 235 and Grijpma et al. Makromol. Chem. Rapid Commun. 14 (1993) 155–161.

Tetrahydrofuran is a particularly suitable solvent; however, it is also possible to use, for example, ethyl acetate or butyl acetate or other solvents which do not react with isocyanates but dissolve polylactide.

The reaction can also be carried out without solvent. In this case, to prepare the products of the formula I according to the invention the polyisocyanate is added to the molten polylactide, or to prepare the products of the formula II according to the invention first the polyisocyanate and then the end group former are added to the molten polylactide.

EXAMPLE 1

1350 g of polylactide with a molecular weight of about 11,600 are dissolved in 5400 g of tetrahydrofuran (THF) and heated to boiling. 6670 g of a 1% strength solution of a triisocyanate with a molecular weight of 573 in THF, and then 0.25 g of dibutyltin dilaurate, are added. The mixture is refluxed for 5 hours and then cooled to 40° C. 4150 g of a 1% strength solution of 3-aminopropyltrimethoxysilane in THF are added, and the mixture is stirred at 40° C. for 2 hours. A polymer with a K value of 26 (measured as 1% strength solution in dimethylformamide) is obtained.

EXAMPLE 2

3490 g of a 1% strength solution of mercaptosuccinic acid in tetrahydrofuran are used in place of the solution of 3-aminopropyltrimethoxysilane used in Example 1.

EXAMPLE 3

2140 g of a 1% strength solution of thioglycolic acid in tetrahydrofuran are used in place of the solution of 3-aminopropyltrimethoxysilane used in Example 1.

EXAMPLE 4

2470 g of a 1% strength solution of 2-mercaptopropionic acid in tetrahydrofuran are used in place of the solution of 3-aminopropyltrimethoxysilane used in Example 1.

EXAMPLE 5

5280 g of a 1% strength solution of 3-aminopropyltriethoxysilane in tetrahydrofuran are used in place of the solution of 3-aminopropyltrimethoxysilane used in Example 1.

EXAMPLE 6

1960 g of a 1% strength solution of cyanoguanidine in tetrahydrofuran are used in place of the solution of 3-aminopropyltrimethoxysilane used in Example 1.

EXAMPLE 7

400 g of a 1% strength solution of ammonia in tetrahydrofuran are used in place of the solution of 3-aminopropyltrimethoxysilane used in Example 1.

EXAMPLE 8

4240 g of a 1% strength solution of 2,4-dinitroaniline in tetrahydrofuran are used in place of the solution of 3-aminopropyltrimethoxysilane used in Example 1.

EXAMPLE 9

3890 g of a 1% strength solution of 2-methoxy-5-nitroaniline in tetrahydrofuran are used in place of the solution of 3-aminopropyltrimethoxysilane used in Example 1.

EXAMPLE 10

2510 g of a 1% strength solution of diaminomaleonitrile in tetrahydrofuran are used in place of the solution of 3-aminopropyltrimethoxysilane used in Example 1.

EXAMPLE 11

1960 g of a 1% strength solution of 3-amino-1H-1,2,4-triazole in tetrahydrofuran are used in place of the solution of 3-aminopropyltrimethoxysilane used in Example 1.

EXAMPLE 12

2050 g of a 1% strength solution of N,N-dimethylethylenediamine in tetrahydrofuran are used in place of the solution of 3-aminopropyltrimethoxysilane used in Example 1.

EXAMPLE 13

2930 g of a 1% strength solution of melamine in tetrahydrofuran are used in place of the solution of 3-aminopropyltrimethoxysilane used in Example 1.

EXAMPLE 14

4520 g of a 1% strength solution of 9-aminoacridine in tetrahydrofuran are used in place of the solution of 3-aminopropyltrimethoxysilane used in Example 1.

EXAMPLE 15

3400 g of a 1% strength solution of triethylenetetramine in tetrahydrofuran are used in place of the solution of 3-aminopropyltrimethoxysilane used in Example 1.

EXAMPLE 16

In place of the lactide of approximate molecular weight 11,600 in Example 1, 1200 g of polylactide of approximate molecular weight 4000 were used. The amount of isocyanate solution (17,190 g) and of 3-aminopropyltrimethoxysilane solution (11,100 g) were adjusted accordingly.

EXAMPLE 17

9000 g of a 1% strength solution of mercaptosuccinic acid in tetrahydrofuran were used in place of the solution of 3-aminopropyltrimethoxysilane in tetrahydrofuran used in Example 16.

EXAMPLE 18

5520 g of a 1% strength solution of thioglycolic acid in tetrahydrofuran were used in place of the solution of 3-aminopropyltrimethoxysilane in tetrahydrofuran used in Example 16.

EXAMPLE 19

6360 g of a 1% strength solution of 2-mercaptopropionic acid in tetrahydrofuran were used in place of the solution of 3-aminopropyltrimethoxysilane in tetrahydrofuran used in Example 16.

EXAMPLE 20

13,620 g of a 1% strength solution of 3-aminopropyltriethoxysilane in tetrahydrofuran were used in place of the solution of 3-aminopropyltrimethoxysilane in tetrahydrofuran used in Example 16.

EXAMPLE 21

5040 g of a 1% strength solution of cyanoguanidine in tetrahydrofuran were used in place of the solution of 3-aminopropyltrimethoxysilane in tetrahydrofuran used in Example 16.

EXAMPLE 22

1020 g of a 1% strength solution of ammonia in tetrahydrofuran were used in place of the solution of 3-aminopropyltrimethoxysilane in tetrahydrofuran used in Example 16.

EXAMPLE 23

10,920 g of a 1% strength solution of 2,4-dinitroaniline in tetrahydrofuran were used in place of the solution of 3-aminopropyltrimethoxysilane in tetrahydrofuran used in Example 16.

EXAMPLE 24

10,020 g of a 1% strength solution of 2-methoxy-5-nitroaniline in tetrahydrofuran were used in place of the solution of 3-aminopropyltrimethoxysilane in tetrahydrofuran used in Example 16.

EXAMPLE 25

6480 g of a 1% strength solution of diaminomaleonitrile in tetrahydrofuran were used in place of the solution of 3-aminopropyltrimethoxysilane in tetrahydrofuran used in Example 16.

EXAMPLE 26

5040 g of a 1% strength solution of 3-amino-1H-1,2,4-triazole in tetrahydrofuran were used in place of the solution of 3-aminopropyltrimethoxysilane in tetrahydrofuran used in Example 16.

EXAMPLE 27

5280 g of a 1% strength solution of N,N-dimethylethylenediamine in tetrahydrofuran were used in place of the solution of 3-aminopropyltrimethoxysilane in tetrahydrofuran used in Example 16.

EXAMPLE 28

7560 g of a 1% strength solution of melamine in tetrahydrofuran were used in place of the solution of 3-aminopropyltrimethoxysilane in tetrahydrofuran used in Example 16.

EXAMPLE 29

11,640 g of a 1% strength solution of 9-aminoacridine in tetrahydrofuran were used in place of the solution of 3-aminopropyltrimethoxysilane in tetrahydrofuran used in Example 16.

EXAMPLE 30

8760 g of a 1% strength solution of triethylenetetramine in tetrahydrofuran were used in place of the solution of 3-aminopropyltrimethoxysilane in tetrahydrofuran used in Example 16.

EXAMPLE 31

1350 g of polylactide with a molecular weight of about 11,600 are dissolved in 5400 g of tetrahydrofuran (THF) and heated to boiling. 5870 g of a 1% strength solution of a triisocyanate with a molecular weight of 504 in THF, and 0.25 g of dibutyltin dilaurate, are added. The mixture is refluxed for 5 hours and then cooled to 40° C. 4310 g of a 1% strength solution of 3-aminopropyltrimethoxysilane in THF are added, and the mixture is stirred at 40° C. for 2 hours. A product with a K value of 28 (measured as 1% strength solution in dimethylformamide) is obtained.

EXAMPLE 32

3490 g of a 1% strength solution of mercaptosuccinic acid in tetrahydrofuran were used in place of the solution of 3-aminopropyltrimethoxysilane in tetrahydrofuran used in Example 31.

EXAMPLE 33

2140 g of a 1% strength solution of thioglycolic acid in tetrahydrofuran were used in place of the solution of 3-aminopropyltrimethoxysilane in tetrahydrofuran used in Example 31.

EXAMPLE 34

2470 g of a 1% strength solution of 2-mercaptopropionic acid in tetrahydrofuran were used in place of the solution of 3-aminopropyltrimethoxysilane in tetrahydrofuran used in Example 31.

EXAMPLE 35

5280 g of a 1% strength solution of 3-aminopropyltriethoxysilane in tetrahydrofuran were used in place of the solution of 3-aminopropyltrimethoxysilane in tetrahydrofuran used in Example 31.

EXAMPLE 36

1960 g of a 1% strength solution of cyanoguanidine in tetrahydrofuran were used in place of the solution of 3-aminopropyltrimethoxysilane in tetrahydrofuran used in Example 31.

EXAMPLE 37

400 g of a 1% strength solution of ammonia in tetrahydrofuran were used in place of the solution of 3-aminopropyltrimethoxysilane in tetrahydrofuran used in Example 31.

EXAMPLE 38

4240 g of a 1% strength solution of 2,4-dinitroaniline in tetrahydrofuran were used in place of the solution of 3-aminopropyltrimethoxysilane in tetrahydrofuran used in Example 31.

EXAMPLE 39

3890 g of a 1% strength solution of 2-methoxy-5-nitroaniline in tetrahydrofuran were used in place of the solution of 3-aminopropyltrimethoxysilane in tetrahydrofuran used in Example 31.

EXAMPLE 40

2510 g of a 1% strength solution of diaminomaleonitrile in tetrahydrofuran were used in place of the solution of 3-aminopropyltrimethoxysilane in tetrahydrofuran used in Example 31.

EXAMPLE 41

1960 g of a 1% strength solution of 3-amino-1H-1,2,4-triazole in tetrahydrofuran were used in place of the solution of 3-aminopropyltrimethoxysilane in tetrahydrofuran used in Example 31.

EXAMPLE 42

2050 g of a 1% strength solution of N,N-dimethylethylenediamine in tetrahydrofuran were used in place of the solution of 3-aminopropyltrimethoxysilane in tetrahydrofuran used in Example 31.

EXAMPLE 43

2930 g of a 1% strength solution of melamine in tetrahydrofuran were used in place of the solution of 3-aminopropyltrimethoxysilane in tetrahydrofuran used in Example 31.

EXAMPLE 44

4520 g of a 1% strength solution of 9-aminoacridine in tetrahydrofuran were used in place of the solution of 3-aminopropyltrimethoxysilane in tetrahydrofuran used in Example 31.

EXAMPLE 45

3400 g of a 1% strength solution of triethylenetetramine in tetrahydrofuran were used in place of the solution of 3-aminopropyltrimethoxysilane in tetrahydrofuran used in Example 31.

EXAMPLE 46

In place of the lactide of approximate molecular weight 11,600 in Example 31, 1200 g of a polylactide of approximate molecular weight 400 were used. The amounts of isocyanate solution (15,120 g) and of 3-aminopropyltrimethoxysilane solution (11,100 g) were adjusted accordingly.

EXAMPLE 47

9000 g of a 1% strength solution of mercaptosuccinic acid in tetrahydrofuran were used in place of the solution of 3-aminopropyltrimethoxysilane in tetrahydrofuran used in Example 46.

EXAMPLE 48

5520 g of a 1% strength solution of thioglycolic acid in tetrahydrofuran were used in place of the solution of 3-aminopropyltrimethoxysilane in tetrahydrofuran used in Example 46.

EXAMPLE 49

6360 g of a 1% strength solution of 2-mercaptopropionic acid in tetrahydrofuran were used in place of the solution of 3-aminopropyltrimethoxysilane in tetrahydrofuran used in Example 46.

EXAMPLE 50

13,620 g of a 1% strength solution of 3-aminopropyltriethoxysilane in tetrahydrofuran were used in place of the solution of 3-aminopropyltrimethoxysilane in tetrahydrofuran used in Example 46.

EXAMPLE 51

5040 g of a 1% strength solution of cyanoguanidine in tetrahydrofuran were used in place of the solution of 3-aminopropyltrimethoxysilane in tetrahydrofuran used in Example 46.

EXAMPLE 52

1020 g of a 1% strength solution of ammonia in tetrahydrofuran were used in place of the solution of 3-aminopropyltrimethoxysilane in tetrahydrofuran used in Example 46.

EXAMPLE 53

10,920 g of a 1% strength solution of 2,4-dinitroaniline in tetrahydrofuran were used in place of the solution of 3-aminopropyltrimethoxysilane in tetrahydrofuran used in Example 46.

EXAMPLE 54

10,020 g of a 1% strength solution of 2-methoxy-5-nitroaniline in tetrahydrofuran were used in place of the solution of 3-aminopropyltrimethoxysilane in tetrahydrofuran used in Example 46.

EXAMPLE 55

6480 g of a 1% strength solution of diaminomaleonitrile in tetrahydrofuran were used in place of the solution of 3-aminopropyltrimethoxysilane in tetrahydrofuran used in Example 46.

EXAMPLE 56

5040 g of a 1% strength solution of 3-amino-1H-1,2,4-triazole in tetrahydrofuran were used in place of the solution of 3-aminopropyltrimethoxysilane in tetrahydrofuran used in Example 46.

EXAMPLE 57

5280 g of a 1% strength solution of N,N-dimethylethylenediamine in tetrahydrofuran were used in place of the solution of 3-aminopropyltrimethoxysilane in tetrahydrofuran used in Example 46.

EXAMPLE 58

7560 g of a 1% strength solution of melamine in tetrahydrofuran were used in place of the solution of 3-aminopropyltrimethoxysilane in tetrahydrofuran used in Example 46.

EXAMPLE 59

11,640 g of a 1% strength solution of 9-aminoacridine in tetrahydrofuran were used in place of the solution of 3-aminopropyltrimethoxysilane in tetrahydrofuran used in Example 46.

EXAMPLE 60

8760 g of a 1% strength solution of triethylenetetramine in tetrahydrofuran were used in place of the solution of 3-aminopropyltrimethoxysilane in tetrahydrofuran used in Example 46.

EXAMPLE 61

1350 g of polylactide with a molecular weight of about 11,600 are dissolved in 5400 g of tetrahydrofuran and heated to boiling. 6670 g of a 1% strength solution of a triisocyanate with a molecular weight of 573 are added and then 0.25 g of dibutyltin dilaurate is added. The reaction is continued until the isocyanate concentration is constant.

USE EXAMPLE

In each case 2 g of an 8.5% strength solution in THF of the polymer obtained as in one of the examples are mixed with one drop of water and, using a brush, part of this solution is applied to an alumina substrate. After 12 hours, it is thoroughly washed with pure THF and blown dry with nitrogen.

The substrate is placed in a frame and polymeric or copolymeric polylactide is pressed on with a punch under a pressure of 100 bar at 200° C. for 10 min.

COMPARATIVE TEST

The polymeric or copolymeric polylactide is pressed on the substrate without the pretreatment according to the invention as in the use example.

| | Film test | |
|---|---|---|
| | Adhesive force | Type of fracture |
| Use example | >80N | Cohesion fracture |
| Comparative test | not measurable | Adhesion fracture |
| Film test | 10–30N | Adhesion fracture |

We claim:
1. Polylactide of the formula structure I

$$(R^1—OCONH)_n—R^2 \qquad (I)$$

where $R^1$ is a polylactide residue with a degree of polymerization, based on lactic acid units, of about 5 to 5500 and $R^2$ is the n-functional radical of a tri-, tetra- or higher polyisocyanate, wherein n is the number of isocyanate groups originally on $R^2$.

2. Polylactide of the formula II $$(R^1—OCONH)_n—R^2—(NCOR^3)_p$$

where $R^1$ is a polylactide residue with a degree of polymerization, based on lactic acid units, of about 5 to 5500, $R^2$ is the (n+p)-functional radical of a tri-, tetra or higher polyisocyanate, wherein (n+p) represents the number of isocyanate groups originally on $R^3$, and n and p are each whole numbers greater than zero, $R^3$ is the radical of a compound able to react with isocyanate.

3. Polylactide as claimed in claim 2, wherein $R^3$ has at least one amino, hydroxyl or mercapto group.

4. The polylactide of claim 2, wherein $R^3$ is a compound selected form the group consisting of 3-aminopropyltrimethoxysilane, mercaptosuccinic acid, thioglycolic acid, 2-mercaptopropionic acid, 3-aminopropyltriethoxysilane, cyanoguanidine, ammonia, 2,4-dinitroaniline, 2-methoxy-5-nitroaniline, diaminomaleonitrile, 3-amino-1H-1,2,4-triazole, N,N-dimethylethylenediamine, melamine, 9-aminoacridine, triethylenetetramine and a compound containing at least one amino, mercapto or hydroxyl group.

5. The polylactide of claim 4, wherein the compound containing at least one amino, mercapto or hydroxyl group is a compound selected from the group consisting of an amino acid, an amino phosphanate, a mercapto phosphanate and an hydroxy sulfonate.

* * * * *